May 1, 1956 W. A. MASON, JR 2,743,654
IMPLEMENT ATTACHING APPARATUS FOR TRACTORS
Filed May 19, 1954 2 Sheets-Sheet 1

INVENTOR
WYLIE A. MASON, JR.
Paul O. Pippel
ATTORNEY

May 1, 1956 W. A. MASON, JR 2,743,654
IMPLEMENT ATTACHING APPARATUS FOR TRACTORS
Filed May 19, 1954 2 Sheets-Sheet 2

INVENTOR
WYLE A. MASON, JR.
Paul O. Pippel
ATTORNEY

United States Patent Office 2,743,654
Patented May 1, 1956

2,743,654
IMPLEMENT ATTACHING APPARATUS FOR TRACTORS

Wylie A. Mason, Jr., Memphis, Tenn., assignor to International Harvester Company, a corporation of New Jersey Application May 19, 1954, Serial No. 430,775

8 Claims. (Cl. 97—47.14)

This invention relates to implement attaching apparatus for tractors and particularly to control means therefor. More specifically the invention concerns improved attaching apparatus for tractors facilitating the mounting of implements thereon in integral association and for quickly detaching the implement therefrom.

The invention particularly concerns apparatus for attaching an implement to the front of a tractor substantially without manual intervention, and its principal object is the provision of implement attaching apparatus for tractors incorporating improved means for controlling the operation of the implement and for effecting attachment and detachment of the implement from the tractor.

Another object of the invention is the provision of improved implement attaching apparatus for the integral connection of an implement to a tractor wherein attachment of the implement is made without manual intervention simply by driving the tractor to the implement, and incorporating means for latching the implement to the implement attaching structure and for unlatching the implement so that it can be detached from the tractor simply by backing the tractor away from it.

Another object of the invention is the provision of an implement attaching structure of the two-point type wherein elongated sockets on the tractor are adapted to telescopically and slidably receive corresponding shaft-like members on an implement, and wherein means are provided for adjusting the operating depth of the implement by tilting the socket about a transverse axis.

A further object of the invention is the provision of improved implement attaching apparatus of the two-point type referred to, wherein the implement shafts are locked in place in the respective sockets by latches carried by the sockets, and wherein means are provided for releasing the latch by power derived from the tractor to facilitate detaching the implement therefrom.

Other objects and advantages of the invention will become clear from the following detailed description when read in conjunction with the accompanying drawings, wherein.

Figure 1:
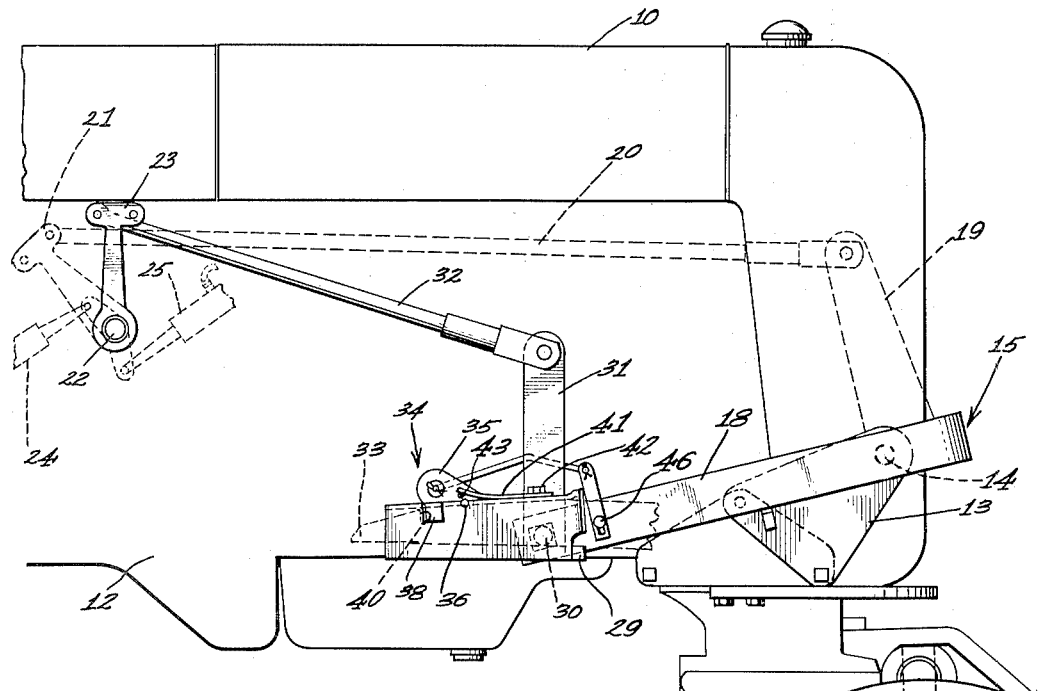
Figure 1 is a view in side elevation of the front end of a tractor having mounted thereon implement attaching apparatus incorporating the features of this invention.

Referring to the drawings, the numeral 10 designates the longitudinally extending body of a tractor having front wheels 11 and a power plant 12. At the front end of the tractor and at each side thereof is mounted a triangular plate or bracket 13 upon which is pivotally mounted, at 14, a rockable supporting member in the form of a bail 15 having a transverse portion 16 extending across the front end of the tractor, and rearwardly bent arms 17 and 18 straddling opposite sides of the front end of the tractor and extending rearwardly along the sides thereof, each of the arms 17 and 18 being pivotally connected to the associated mounting plate or bracket 13. The bail 15 is thus capable of swinging movement in a vertical plane about the axes of the pivots 14, with the rear ends of said arms moving vertically from a location below the axes of the pivots 14 to a position vertically thereabove. Rocking of the rockable member 15 is accomplished by the provision of an upright arm 19 affixed to the forward end of arm 17 and connected by a rod 20 with a power lift rock arm 21 mounted upon a shaft 22 carried by the tractor and rocked by means, not shown, deriving power from the tractor power plant. The arm 21 and a second pair of arms 23 are independently mounted, and rocking thereof may be accomplished, for example, by the independent operation of a pair of hydraulic cylinders, such as are indicated at 24 and 25 in Fig. 1, receiving fluid under pressure from a pump, not shown, deriving its power from the tractor power plant. Actuation of the cylinders 24 and 25 is under the control of the tractor operator, and rocking of the arm 21 acts through rod 20 and upright 19 to rock the member 15 about the axis of the pivots 14.

At the rear end of each of the arms 17 and 18 are mounted tubular socket members 26 and 27, respectively, and since these sockets are substantial duplicates, a description of one will suffice for both. Each of the sockets 26 and 27 comprises a longitudinally elongated member 28 in the form of an inverted U having secured between the downwardly extending arms thereof a base plate 29 forming the bottom of the socket. The socket is pivotally connected by a pin 30 at its forward end to the rear end of the associated arm 17 or 18 of the bail 15. As clearly shown in Figure 2, the pivotal connection is made between the inner wall of the socket member 27 and the arm 18. Thus the socket member 28 is capable of vertical swinging movement about the pivot 30, and this vertical swinging of the socket member is under the control of the tractor operator through the provision of an arm 31 affixed to the inner wall of the U-shaped socket 28 and extending upwardly therefrom. Arm 31 on each side of the tractor is connected by a rod 32 with the associated lift arm 23 actuated by the hydraulic ram 25. Rocking of the arm 23 forwardly and rearwardly thus results in up and down movement of the socket 27 about its pivot 30.

Figure 3:
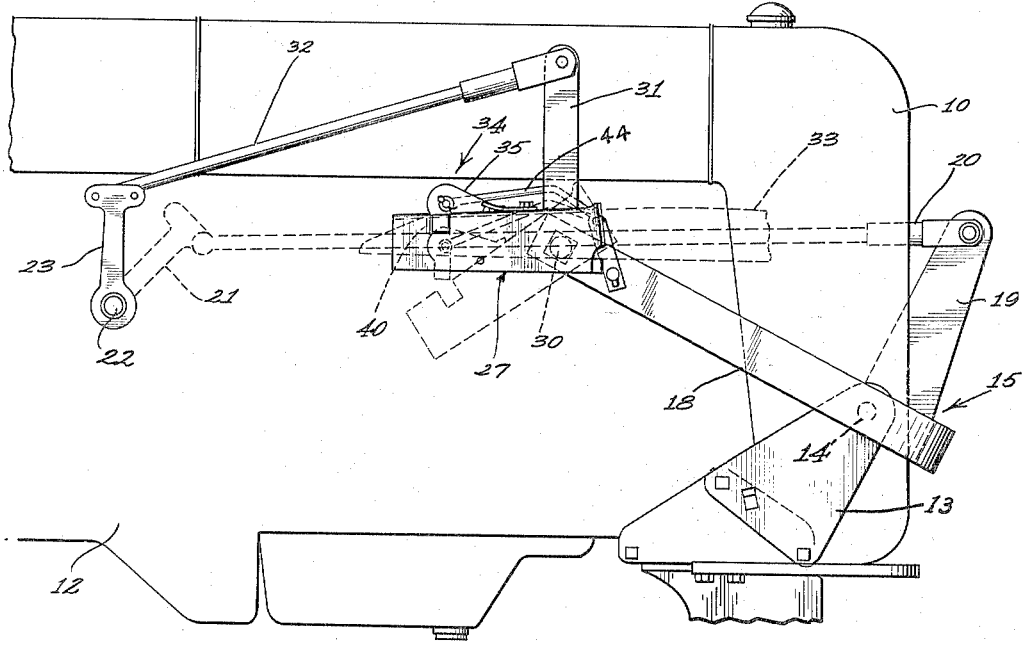
Figure 3 is a view similar to Figure 1 showing the position of the parts when the implement is in raised position and the latch has been released.
Figure 4:
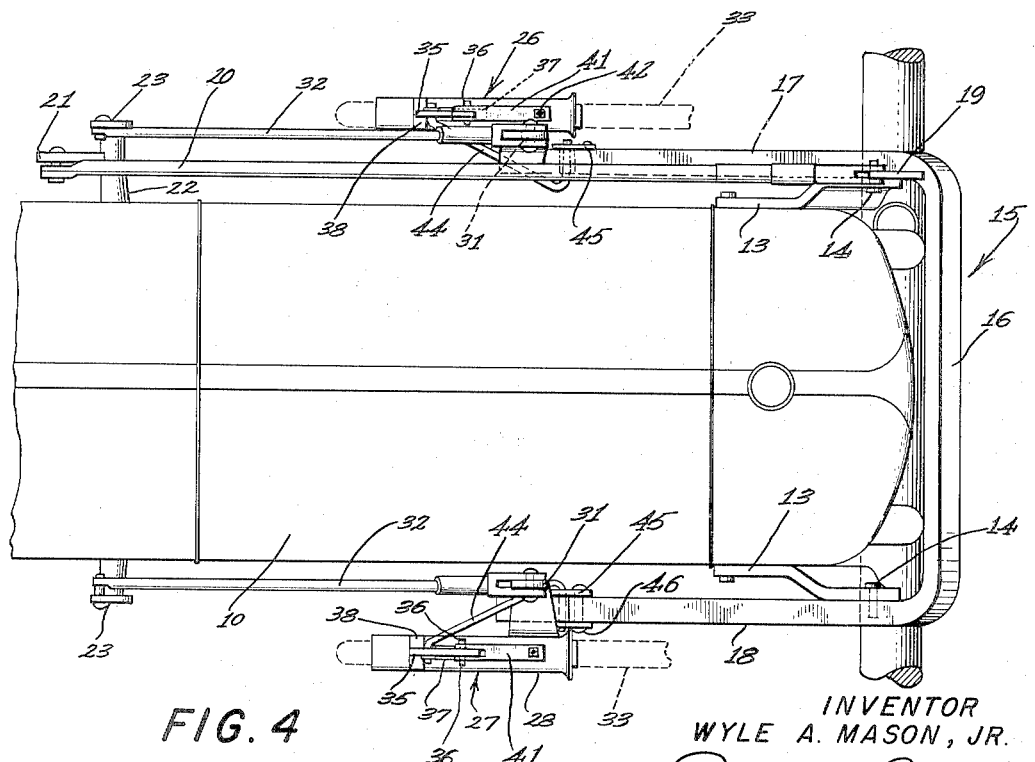
Figure 4 is a plan view of the structure shown in Figure 1.

As indicated in Figures 3 and 4, the implement, which is adapted for mounting upon the tractor, may be in the form of a cultivator provided with longitudinally extending laterally spaced, rigid shaft-like members 33 adapted to be telescopically and slidably received in the respective socket members 26 and 27 on opposite sides of the tractor body. The length of the sockets 26 and 27 and the close association of the respective shafts 33 therewith form an integral connection by which the implement may be transported on the tractor and raised and lowered as a unit with the supporting bail structure 15 and the associated sockets 26 and 27.

Each of the sockets 26 and 27 is provided with a latch mechanism indicated at 34 comprising a rockable member 35 pivoted upon trunnions 36 received in depressions in the upper surface of the U-shaped socket 28. The body of the rockable member 35 is receivable in a slot 37 formed in the upper surface of the socket, and is provided with a latch block 38 adapted to be received in a transverse notch 39 formed in the socket member. In the position of the latch member 35 shown in Figure 1, the block 38 is received in a groove 40 formed in the upper surface of the forward end of the shaft-like member 33.

The latch member 35 is biased to this latched position by the provision of a leaf spring 41 secured at one end to the socket by a bolt 42 and at its other end engaging a peg 43 mounted upon the latch member 35 above the trunnion 36. A peg 43 is provided on each side of the latch 35, and the leaf spring 41 is slotted to straddle the member 35 and engage the pegs 43. In the position indicated in Figure 1, the pegs 43 are over center slightly in one direction with respect to the axis of the trunnions 36 so that the latch is held in latching position by the operation of the spring 41.

In the position of the parts shown in Figure 1 the operating depth of the cultivator or other implement mounted upon the tractor by means of the shafts 33 may be adjusted by adjusting the position of the sockets 26 and 27 about their pivots upon the respective arms 17 and 18. This causes the earth-working tools of the implement to angle downwardly for deeper penetration or upwardly for more shallow penetration.

In Figure 1 the implement attaching parts are shown in a lowered position. Upon upward movement of these parts to a transport position such as is indicated in Figure 3, the rod 32 acts as a thrust or stop member upon the associated socket members 26 and 27 to maintain them in a position generally parallel with the ground by substantially preventing rotation of the socket members throughout the range of movement from a location below to a position above the axis of the bail pivots 14.

Figure 2:
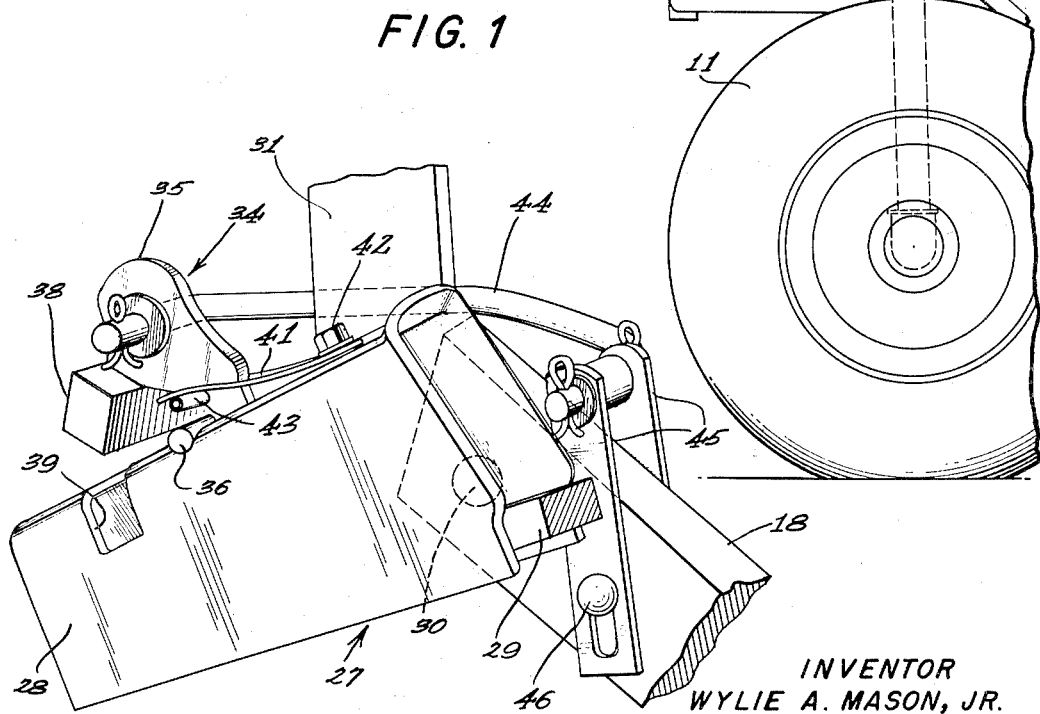
Figure 2 is an enlarged detail in perspective of one of the sockets of the two-point hitch of this invention, illustrating the manner in which the latch mechanism is released when the implement is to be detached from the tractor.

Release of the latch 34 from engagement with the implement shaft 33 may be effected by rocking of the sockets about their pivots 30, and this is advantageously accomplished in the raised position, as indicated in Figure 3, wherein the released position of the parts is indicated in dotted lines. In this position, a latch trip link 44 becomes effective. Link 44 is pivotally connected at one end to the latch member 35 and at its other end to a pair of links 45 pivotally mounted at 46 upon the arms 17 and 18 of the rockable supporting member 15. When the socket 28 is tilted in an anti-clockwise direction by rocking of the arm 23 on the tractor, the link 44 engages the end of the associated arm 17 or 18, as shown in Figure 2, and rocks the latch 34 in a clockwise direction about the axes of the trunnions 36, until the peg 43 is over-center to the right of the trunnion and the latch is held out of engagement of the groove 40 of the implement shaft 33 by the action of the spring 41. The socket and the implement can then be returned to their substantially horizontal position and lowered to the ground by rocking the arm 21 on the tractor in a counterclockwise direction upon return of the socket and implement to their horizontal position, the peg 43 remains overcenter with respect to the trunnion 36 so that latch 38 continues to be held out of the groove 40, and may be manually returned to its position in notch 39 after the implement is separated from the tractor. The implement can then be released from the tractor by backing the tractor away from it.

It is believed that the novel implement attaching apparatus of this invention will be clearly understood from the foregoing description. It should likewise be understood, however, that the invention has been described in its preferred embodiment only and that modifications may be made therein without departing from the spirit of the invention or the scope of the appended claims.

What is claimed is:

1. In implement attaching apparatus for tractors wherein a socket member is provided on the tractor for cooperative connection with a complementary shaft member on the implement, and wherein releasable latching means is associated with the socket member and cooperable with the shaft to lock the parts against relative displacement, means pivotally connecting said socket member to the tractor for rocking movement thereof, power means on the tractor operatively connected to said socket member for adjusting the position of the latter about its pivot axis, and a latch actuating member anchored to a part on the tractor and operatively connected to said latching means for releasing the latter in response to rocking said socket member in one direction.

2. In implement attaching apparatus for tractors wherein a socket member is provided on the tractor for cooperative connection with a complementary shaft member on the implement, and wherein releasable latching means is associated with the socket member and cooperable with the shaft to lock the parts against relative displacement, a movable support mounted on the tractor, means for pivotally mounting the socket member on said support for rocking movement relative thereto, power transmission means on the tractor connected to said support for effecting movement thereof, independently operable power means on the tractor connected to said socket member for pivoting the latter about its axis on the support, and actuating means associated with said support for releasing said latching means in response to rocking said socket member in one direction about its pivot.

3. The invention set forth in claim 2, wherein the latching means includes a latch member pivotally mounted on the socket member and spring biased to latching position with respect to the implement shaft member, and the latch actuating member is a link engageable with a part on the support during movement of the latter and functioning as a lever to pivot the latch member against the action of the spring.

4. The invention set forth in claim 3, wherein said link is connected at one end to the latch member and at its other end to another link pivotally mounted on the support.

5. In implement attaching apparatus for tractors wherein a socket member is provided on the tractor for cooperative connection with a complementary shaft member on the implement, and wherein releasable latching means is associated with the socket member and cooperable with the shaft to lock the parts against relative displacement, supporting means pivotally mounted on the tractor for vertical movement, means pivotally mounting the socket member on said supporting means, power means on the tractor operatively connected to said supporting means for effecting vertical movement thereof about its pivot, another power means on the tractor operatively connected to the socket member for rocking the latter about its pivot, and link means connected to the supporting means and to said latching means effective to release the latter upon rocking of the socket member in one direction about its pivot on the supporting means.

6. In implement attaching apparatus for tractors wherein a socket member is provided on the tractor for cooperative connection with a complementary shaft member on the implement, and wherein releasable latching means is associated with the socket member and cooperable with the shaft member to lock the parts against relative displacement, supporting means pivotally mounted on the tractor for vertical movement, means pivotally mounting the socket member on said supporting means, power means on the tractor operatively connected to said supporting means for effecting vertical swinging thereof about its pivot, a connection between the tractor and said socket member effective to maintain the latter substantially parallel to the ground during vertical movement of the supporting means, said connection including power transmission means for rocking the socket member about its pivot, and ling means connected to the supporting means and to said latching means effective to release the latter upon rocking the socket member in one direction about its pivot on the supporting means.

7. Implement attaching mechanism for a tractor, comprising a rockable member pivotally mounted at the forward end of the tractor for vertical swinging and including laterally spaced arms, one on each side of the tractor, power means on the tractor operatively connected to said rockable member for swinging the latter about its pivot to vertically move said arms, an elongated tubular member pivotally mounted on the end of each of said arms for vertical movement therewith and adapted for the sliding reception of complementary shaft members on the implement, releasable latch means on said tubular members, spring biased to latching engagement with said shaft members to provide a laterally stable unitary implement attachment adapted to be raised and lowered with the vertical movement of the tubular members, connecting means between the tractor and said tubular members for rocking them in one direction about their pivots, and connections between said arms and said latch means effective to automatically release the latch means in response to rocking said tubular members.

8. The invention set forth in claim 7, wherein the connecting means between the tractor and the tubular members includes means for adjusting the tubular members about their pivots and holding them in adjusted positions.

References Cited in the file of this patent

UNITED STATES PATENTS

| | | |
|---|---|---|
| 1,464,740 | Benjamin et al. | Aug. 14, 1923 |
| 1,864,639 | Crezee | June 28, 1932 |
| 2,321,464 | Cook | June 8, 1943 |
| 2,368,168 | Smith et al. | Jan. 30, 1945 |
| 2,562,817 | Pethick | July 31, 1951 |
| 2,602,389 | Markel | July 8, 1952 |
| 2,701,510 | Altgelt | Feb. 8, 1955 |